US012764310B2

(12) United States Patent
Li et al.

(10) Patent No.: US 12,764,310 B2
(45) Date of Patent: *Oct. 13, 2026

(54) # CROSS-COMPONENT QUANTIZATION IN VIDEO CODING

(71) Applicant: ZTE Corporation, Shenzhen (CN)

(72) Inventors: Ming Li, Shenzhen (CN); Ping Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/884,084

(22) Filed: Sep. 12, 2024

(65) Prior Publication Data

US 2025/0008126 A1 Jan. 2, 2025

Related U.S. Application Data

(63) Continuation of application No. 17/466,788, filed on Sep. 3, 2021, now Pat. No. 12,126,821, which is a (Continued)

(51) Int. Cl.
*H04N 19/186* (2014.01)
*H04N 19/124* (2014.01)
*H04N 19/70* (2014.01)

(52) U.S. Cl.
CPC ......... *H04N 19/186* (2014.11); *H04N 19/124* (2014.11); *H04N 19/70* (2014.11)

(58) Field of Classification Search
CPC ..... H04N 19/186; H04N 19/124; H04N 19/70
See application file for complete search history.

(56) References Cited

U.S. PATENT DOCUMENTS 10,904,530 B2 1/2021 Tourapis et al.
10,986,341 B2 4/2021 Tourapis et al.
(Continued)

FOREIGN PATENT DOCUMENTS

AU 2014216004 A1 3/2015
CN 103329539 A 9/2013
(Continued)

OTHER PUBLICATIONS

Chinese office action issued in CN Patent Application No. 201980092594.4, dated Dec. 26, 2024, 12 pages. English translation included.

(Continued)

*Primary Examiner* — Fabio S Lima
(74) *Attorney, Agent, or Firm* — Ashurst Perkins Coie US LLP

(57) ABSTRACT

A video decoding technique includes parsing a bitstream to determine a quantization parameter (QP) for a luma component of a region from a data unit of a parameter set included in the bitstream, determining a flag from the data unit of the parameter set, determining, in a case that the flag is equal to a first value, a QP for a chroma component of the region as a first function of the QP for the luma component and a default chroma delta QP indicated by the flag, determining, in a case that the flag is equal to a second value, the QP for the chroma component of the region by (a) obtaining a delta chroma QP from the data unit, and (b) determining the QP for the chroma component as a second function of the QP for the luma component and the delta chroma QP, and decoding the chroma component using the QP for the chroma component in a case that the parameter set is activated for decoding the region.

10 Claims, 8 Drawing Sheets

| | Descriptor |
|---|---|
| **default_chroma_qp_offset_flag** | u(1) |
| if ( ! default_chroma_qp_offset_flag ) { | |
| **cb_qp_offset** | se(v) |
| **cr_qp_offset** | se(v) |
| } | |

| | Descriptor |
|---|---|
| **default_cb_qp_offset_flag** | u(1) |
| if ( ! default_cb_qp_offset_flag ) | |
| **cb_qp_offset** | se(v) |
| **default_cr_qp_offset_flag** | u(1) |
| if ( ! default_cr_qp_offset_flag ) | |
| **cb_qp_offset** | se(v) |

Related U.S. Application Data continuation of application No. PCT/CN2019/076977, filed on Mar. 5, 2019.

(56) References Cited

U.S. PATENT DOCUMENTS

| | | | | |
|---|---|---|---|---|
| 11,388,413 | B1 | 7/2022 | Wu et al. | |
| 11,445,201 | B2 | 9/2022 | Gao | |
| 11,503,297 | B2 | 11/2022 | Wang et al. | |
| 2014/0003497 | A1 | 1/2014 | Sullivan et al. | |
| 2015/0003518 | A1 | 1/2015 | Nguyen et al. | |
| 2015/0071344 | A1* | 3/2015 | Tourapis | H04N 19/124<br>375/240.03 |
| 2016/0241853 | A1 | 8/2016 | Lim et al. | |
| 2019/0124366 | A1* | 4/2019 | Zhao | H04N 19/186 |

FOREIGN PATENT DOCUMENTS

| | | | | |
|---|---|---|---|---|
| CN | 104205836 | A | 12/2014 | |
| CN | 104427339 | A | 3/2015 | |
| CN | 105359521 | A | 2/2016 | |
| CN | 107710765 | A | 2/2018 | |
| CN | 107852512 | A | 3/2018 | |
| CN | 107948651 | A | 4/2018 | |
| CN | 109196863 | A | 1/2019 | |
| EP | 2843949 | A1 * | 3/2015 | H04N 19/46 |
| EP | 3935845 | A4 | 1/2022 | |
| JP | 6747626 | B1 | 8/2020 | |
| WO | 2014205561 | A1 | 12/2014 | |
| WO | 2015035092 | A2 | 3/2015 | |
| WO | 2016056977 | A1 | 4/2016 | |
| WO | 2017/219342 | A1 | 12/2017 | |

OTHER PUBLICATIONS

Chinese Notification to Complete Formalities of Registration issued in CN Patent Application No. 201980092594.4, dated May 28, 2025, 9 pages. English translation included.

International Search Report and Written Opinion mailed on Dec. 2, 2019 for International Application No. PCT/CN2019/076977, filed on Mar. 5, 2019 (9 pages).

European Search Report for EP Patent Application No. 19918112.4, dated on Oct. 7, 2022, 10 pages.

Lu et al., "Adaptive reshaping for next generation video codec," Proceedings of SPIE, ISSN 0277-786x, vol. 10524, US, Sep. 17, 2018, 12 pages.

Interdigital, "Description of SDR, HDR, and 360 video coding technology proposal by InterDigital Communications and Dolby Laboratories," 122, MPEG Meeting, Apr. 16-20, 2018, San Diego, ISO/IEC JTC1/SC29/WG11, 60 pages.

European Communication pursuant to Article 94(3) EPC for EP Patent Application No. 19918112.4, dated on Aug. 6, 2024, 5 pages.

* cited by examiner

| | Descriptor |
|---|---|
| **default_chroma_qp_offset_flag** | u(1) |
| if ( ! default_chroma_qp_offset_flag ) { | |
| **cb_qp_offset** | se(v) |
| **cr_qp_offset** | se(v) |
| } | |

FIG. 4A

| | Descriptor |
|---|---|
| **default_cb_qp_offset_flag** | u(1) |
| if ( ! default_cb_qp_offset_flag ) | |
| **cb_qp_offset** | se(v) |
| **default_cr_qp_offset_flag** | u(1) |
| if ( ! default_cr_qp_offset_flag ) | |
| **cb_qp_offset** | se(v) |

FIG. 4B

| | Descriptor |
|---|---|
| **default_chroma_qp_offset_flag** | u(1) |
| if ( ! default_chroma_qp_offset_flag ) { | |
| **default_cb_qp_offset_flag** | u(1) |
| if ( ! default_cb_qp_offset_flag ) | |
| **cb_qp_offset** | se(v) |
| **default_cr_qp_offset_flag** | u(1) |
| if ( ! default_cr_qp_offset_flag ) | |
| **cr_qp_offset** | se(v) |
| } | |

FIG. 4C

CROSS-COMPONENT QUANTIZATION IN VIDEO CODING

CROSS-REFERENCE TO RELATED APPLICATIONS

This application is a continuation of U.S. patent application Ser. No. 17/466,788, filed on Sep. 3, 2021, which is a continuation of International Patent Application No. PCT/CN2019/076977, filed on Mar. 5, 2019, the contents of each of which are incorporated herein by reference in their entirety.

TECHNICAL FIELD

This patent document is directed generally to video and image encoding and decoding.

BACKGROUND

Video encoding uses compression tools to encode two-dimensional video frames into a compressed bitstream representation that is more efficient for storing or transporting over a network. Advances in devices that can receive digital video and display video and images have increased the demand for digital video content. Industry efforts are currently underway to define next generation of video coding technologies.

SUMMARY

This patent document describes, among other things, techniques for encoding and decoding digital video using cross-component quantization parameter coding embodiments.

Embodiments described in the present application provide video or picture encoding and decoding methods, encoding and decoding devices to at least solve problem of signaling default chroma delta quantization parameter (QP) to alleviate computational burden of an encoder in determining chroma delta QP.

In one example aspect, a method of processing visual information is disclosed. The method includes parsing a bitstream to determine a quantization parameter (QP) for a luma component of a region of the visual information from a data unit of a parameter set included in the bitstream, determining a flag from the data unit of the parameter set, determining, in a case that the flag is equal to a first value, a QP for a chroma component of the region as a first function of the QP for the luma component and a default chroma delta QP indicated by the flag, determining, in a case that the flag is equal to a second value, the QP for the chroma component of the region by (a) obtaining a delta chroma QP from the data unit, and (b) determining the QP for the chroma component as a second function of the QP for the luma component and the delta chroma QP, and decoding the chroma component using the QP for the chroma component in a case that the parameter set is activated for decoding the region.

In another example aspect, a method of generating a coded representation of a visual information is disclosed. The method includes determining a QP for a luma component of a region of the visual information, signaling a QP for a chroma component in a coded representation of the visual information as: including, in case that the QP for the chroma component is equal to a value of a first function of a default QP for the chroma component and the QP for the luma component, in the coded representation, a flag to a first value indicating that the default chroma delta QP is to be used for decoding, and coding the flag in a data unit of a parameter set of the coded representation, and otherwise including, in the coded representation, the flag to a second value and a value in the data unit indicative of a delta chroma QP such that the QP for the chroma component is a second function of the luma component and the delta chroma QP.

In another example aspect, an apparatus for processing one or more bitstreams of a video or picture is disclosed.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIGS. 4A-4C are diagrams illustrating examples of syntax structure for representing parameters of chroma QP in a bitstream.

DETAILED DESCRIPTION

Figure 1A:
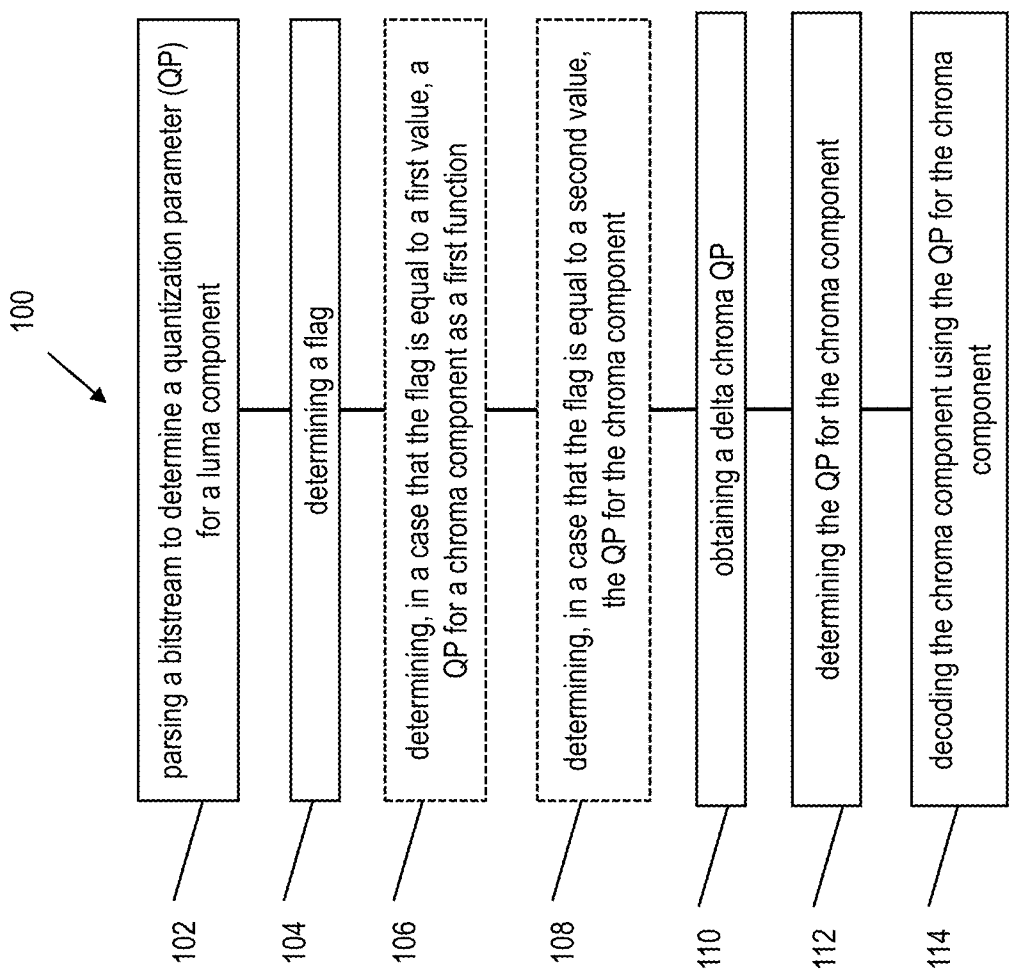
FIG. 1A is a flowchart for an example method of visual information processing.

Section headings are used in the present document only to improve readability and do not limit scope of the disclosed embodiments and techniques in each section to only that section. Certain features are described using the example of the H.264/AVC (advanced video coding) and H.265/HEVC (high efficiency video coding) standards. However, applicability of the disclosed techniques is not limited to only H.264/AVC or H.265/HEVC systems.

This disclosure relates to video processing and communication, in particular to methods and apparatus for encoding a digital video or picture to generate a bitstream, methods and apparatus for decoding a bitstream to reconstruct a digital video or picture.

Brief Discussion

In the current H.266/VVC (Versatile Video Coding) WD (Working Draft), picture-level chroma delta QPs can be signalled in PPS (Picture Parameter Set) (i.e. pps_cb_qp_offset and pps_cr_qp_offset) and tile group header (i.e. tile_group_cb_qp_offset and tile_group_cr_qp_offset). The value of tile-group-level QP is set equal to the sum of luma QP, chroma delta QP signalled in PPS and chroma delta QP signalled in tile group header.

In the current H.266/VVC development, advanced coding tools for chroma, such as dual tree (i.e. separate block partitioning for luma and chroma components of a coding block), CCLM (Cross-Component Linear Mode), etc., bring great benefit to coding efficiency of chroma components. From the perspective of bit allocation, coding efficiency of luma component will be further improved by shifting a number of bits from chroma to luma. This is demonstrated by setting an exemplary chroma delta QP (e.g. equal to 1) at sequence (or at least picture) level in common test condition (CTC) for H.266/VVC software (i.e. VTM). As a result, in bitstream, pps_cb_qp_offset and pps_cr_qp_offset are equal to 1, and tile_group_cb_qp_offset and tile_group_cr_qp_offset are equal to 0.

With the advanced coding tools for chroma, balancing chroma and luma compression gains by shifting bits between chroma and luma components actually improves perceptual quality. In the current H.266/VVC WD, no default (or recommended) values are available for such chroma delta QPs, and an encoder has always to determine chroma delta QPs by itself, which leads to a heavy computational burden of the encoder.

Techniques for compressing digital video and picture utilizes correlation characteristics among pixel samples to remove redundancy in the video and picture. By allocating bits among luma and chroma components, an encoder achieves an operating point with optimal tradeoff between quality and compression in coding a video. Generally, bit allocation can be carried out by determining quantization parameter (QP) for video sequence, picture, different color components and picture regions (wherein a picture region contains one or more coding blocks).

In the current H.266/VVC (Versatile Video Coding) WD (Working Draft), picture-level chroma delta QPs can be signalled in PPS (Picture Parameter Set) (i.e. pps_cb_qp_offset and pps_cr_qp_offset) and tile group header (i.e. tile_group_cb_qp_offset and tile_group_cr_qp_offset). The value of tile-group-level QP is set equal to the sum of luma QP, chroma delta QP signalled in PPS and chroma delta QP signalled in tile group header.

In the current H.266/VVC development, advanced coding tools for chroma, such as dual tree (i.e. separate block partitioning for luma and chroma components of a coding block), CCLM (Cross-Component Linear Mode), etc., bring great benefit to coding efficiency of chroma components. From the perspective of bit allocation, coding efficiency of luma component can be further improved by shifting a number of bits from chroma to luma. This is demonstrated by setting an exemplary chroma delta QP (e.g. equal to 1) at sequence (or at least picture) level in common test condition (CTC) for H.266/VVC software (i.e. VTM). As a result, in bitstream, pps_cb_qp_offset and pps_cr_qp_offset are equal to 1, and tile_group_cb_qp_offset and tile_group_cr_qp_offset are equal to 0.

According to some embodiments described in the present document, there is provided an encoding method for processing video or picture, including:

determining a quantization parameter (QP) for luma component of a picture or a picture region;

calculating a first chroma QP for a chroma component of the picture or the picture region using a default chroma delta QP;

if determining that the first chroma QP is used to code the chroma component, setting a flag to a first value indicating the default chroma delta QP is used, and coding the flag in a data unit of a parameter set in a bitstream;

otherwise, determining a second chroma QP for the chroma component, setting the flag to a second value indicating the default chroma delta QP is not used, setting a chroma delta QP equal to the difference of the QP for luma component and the second chroma QP, and coding the flag and the chroma delta QP in the data unit of the parameter set in the bitstream According to some embodiments of the present document, there is provided a decoding method for processing a bitstream to reconstruct a video or picture, including:

parsing a bitstream to determine a quantization parameter (QP) for luma component of a picture or a picture region from a data unit of a parameter set;

parsing the bitstream to obtain a flag from the data unit of the parameter set;

if the flag equal to a first value, setting a QP for a chroma component of the picture or the picture region equal to a sum of the QP for luma component and a default chroma delta QP indicated by the flag;

otherwise, if the flag equal to a second value, parsing the bitstream to obtain a delta chroma QP from the data unit of the parameter set, and setting the QP for the chroma component equal to a sum of the QP for luma component and the delta chroma QP;

decoding the chroma component using the QP for the chroma component when the parameter set is activated for decoding the picture or the picture region.

By means of the above methods, computational burden of an encoder to determine chroma QP is alleviated, as a chroma QP can be obtained, at least as a candidate chroma QP, using a default chroma delta QP once a QP for luma component is determined.

In some embodiments, a video is composed of a sequence of one or more pictures. A bitstream, which is also sometimes referred to as a video elementary stream, is generated by an encoder processing a video or picture. A bitstream can also be a transport stream or media file that is an output of performing a system layer process on a video elementary stream generated by a video or picture encoder. Decoding a bitstream results in a video or a picture. The system layer process is to encapsulate a video elementary stream. For example, the video elementary stream is packed into a transport stream or media file as payloads. The system layer process also includes operations of encapsulating transport stream or media file into a stream for transmission or a file for storage as payloads. A data unit generated in the system layer process is referred to as a system layer data unit. Information attached in a system layer data unit during encapsulating a payload in the system layer process is called system layer information, for example, a header of a system layer data unit. Extracting a bitstream obtains a sub-bitstream containing a part of bits of the bitstream as well as one or more necessary modifications on syntax elements by the extraction process. Decoding a sub-bitstream results in a video or a picture, which, compared to the video or picture obtained by decoding the bitstream, may be of lower resolution and/or of lower frame rate. A video or a picture obtained from a sub-bitstream could also be a region of the video or picture obtained from the bitstream.

Embodiment 1

Figure 2:
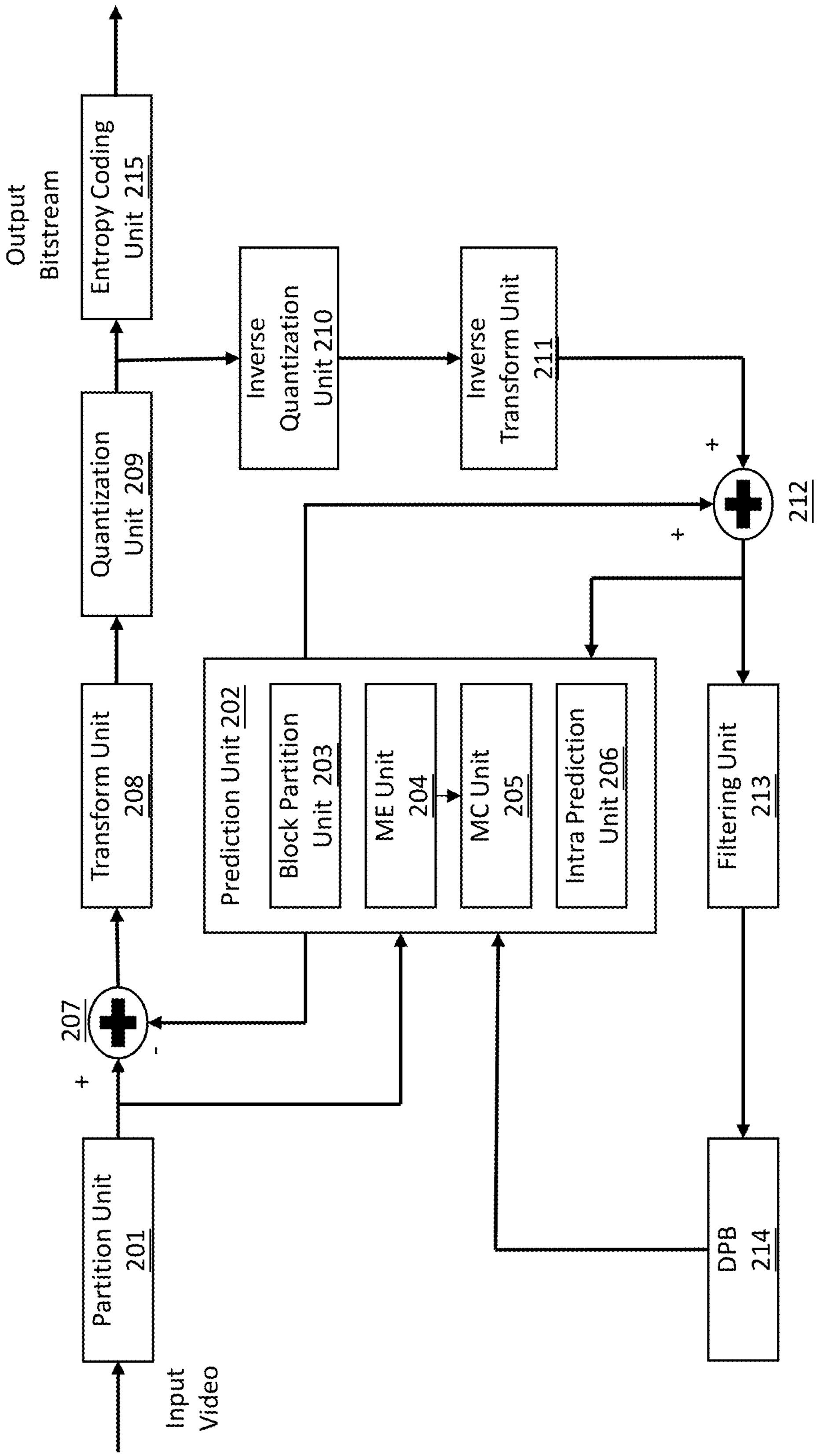
FIG. 2 is a diagram illustrating an example video or picture encoder that implements the methods in this disclosure.

FIG. 2 is a diagram illustrating an encoder utilizing the method in this disclosure in coding a video or a picture. An input of the encoder is a video, and an output is a bitstream. As the video is composed of a sequence of pictures, the encoder processes the pictures one by one in a preset order, i.e. an encoding order. The encoder order is determined according to a prediction structure specified in a configuration file for the encoder. Note that an encoding order of pictures in a video (corresponding to a decoding order of pictures at a decoder end) may be identical to, or may be different from, a displaying order of the pictures.

Partition Unit 201 partitions a picture in an input video according to a configuration of the encoder. Generally, a picture can be partitioned into one or more maximum coding blocks. Maximum coding block is the maximum allowed or configured block in encoding process and usually a square region in a picture. A picture can be partitioned into one more tiles, and a tile may contain an integer number of maximum coding blocks, or a non-integer number of maximum coding blocks. One option is a tile may contain one or more slices. That is, a tile can further be partitioned into one or more slices, and each slice may contain an integer number of maximum coding blocks, or a non-integer number of maximum coding blocks. Another option is a slice contains one or more tiles, or equivalently, a tile group contains one or more tiles. That is, one or more tiles in a certain order in the picture (e.g. raster scan order) forms a tile group (or equivalently a slice). In the following descriptions, "tile group" is used as an example. Partition unit 201 can be configured to partition a picture using a fixed pattern. For example, partition unit 201 partitions a picture into tile groups, and each tile group has a single tile containing a row of maximum coding blocks. Another example is that partition unit 201 partitions a picture into multiple tiles and forms tiles in raster scan order in the picture into tile groups. Alternatively, partition unit 201 can also employ a dynamic pattern to partition the picture into tile group, tile and blocks. For example, to adapt to the restriction of maximum transmission unit (MTU) size, partition unit 201 employs dynamic tile group partitioning method to ensure that a number of coding bits of every tile group does not exceed MTU restriction.

Figure 3:
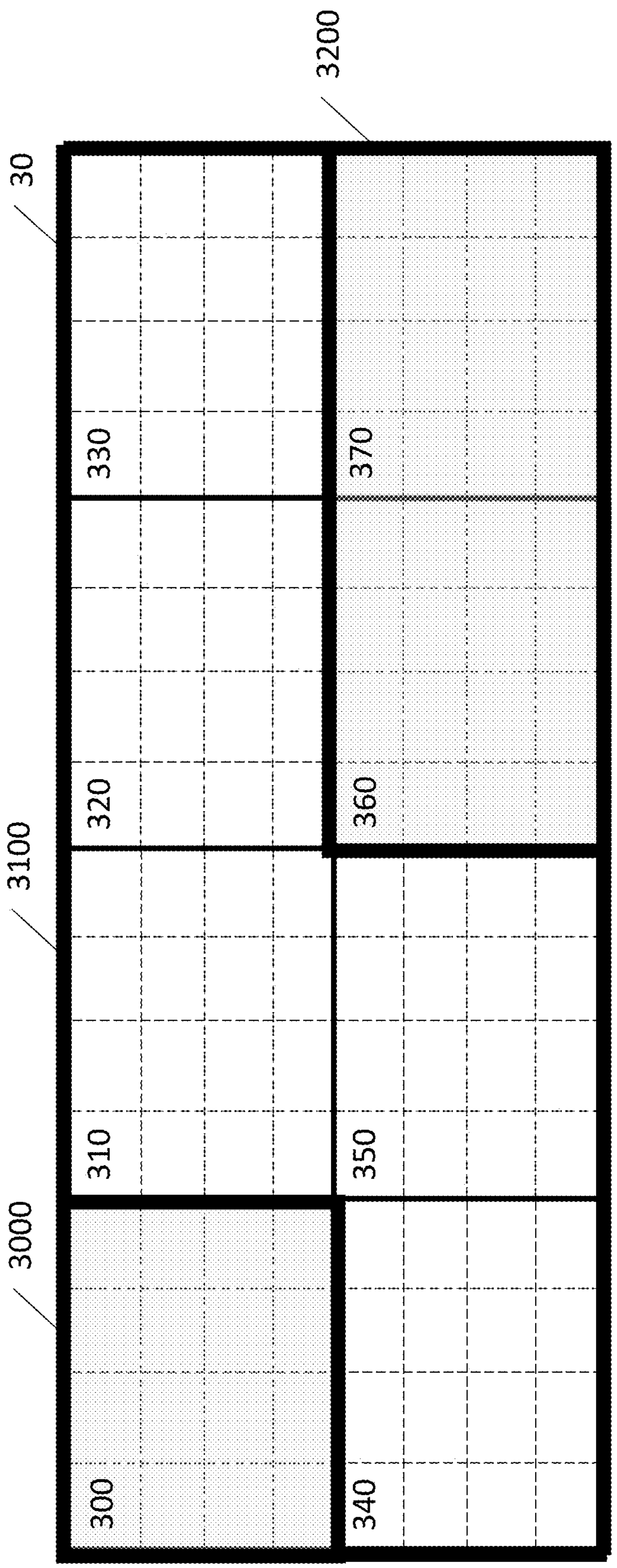
FIG. 3 is a diagram illustrating an example of partitioning a picture into tile groups.

FIG. 3 is a diagram illustrating an example of partitioning a picture into tile groups. Partition unit 201 partitions a picture 30 with 16 by 8 maximum coding blocks (depicted in dash lines) into 8 tiles 300, 310, 320, 330, 340, 350, 360 and 370. Partition unit 201 partitions picture 30 into 3 tile groups. Tile group 3000 contains tile 300, tile group 3100 contains tiles 310, 320, 330, 340, and 350, tile group 3200 contains tiles 360 and 370. One or more tile groups or tiles can be referred as a picture region. Generally, partitioning a picture into one or more tiles is conducted according to an encoder configuration file. Partition unit 201 sets a partitioning parameter to indicate a partitioning manner of the picture into tiles. For example, a partitioning manner can be to partition the picture into tiles of (nearly) equal sizes. Another example is that a partitioning manner may indicate locations of tile boundaries in rows and/or columns to facilitate flexible partitioning.

Output parameters of partition unit 201 indicates a partitioning manner of a picture.

Prediction unit 202 determines prediction samples of a coding block. Prediction unit 202 includes block partition unit 203, ME (Motion Estimation) unit 204, MC (Motion Compensation) unit 205 and intra prediction unit 206. An input of the prediction unit 202 is a maximum coding block outputted by partition unit 201 and attribute parameters associated with the maximum coding block, for example, location of the maximum coding block in a picture, in a tile group and in a tile. Prediction unit 202 partitions the maximum coding block into one or more coding blocks, which can also be further partitioned into smaller coding blocks. One or more partitioning method can be applied including quadtree, binary split and ternary split. Prediction unit 202 determines prediction samples for coding block obtained in partitioning. Optionally, prediction unit 202 can further partition a coding block into one or more prediction blocks to determine prediction samples. Prediction unit 202 employs one or more pictures in DPB (Decoded Picture Buffer) unit 214 as reference to determine inter prediction samples of the coding block. Prediction unit 202 can also employs reconstructed parts of the picture outputted by adder 212 as reference to derive prediction samples of the coding block. Prediction unit 202 determines prediction samples of the coding block and associated parameters for deriving the prediction samples, which are also output parameters of prediction unit 202, by, for example, using general rate-distortion optimization (RDO) methods.

Inside prediction unit 202, block partition unit 203 determines the partitioning of the coding block. Block partition unit 203 partitions the maximum coding block into one or more coding blocks, which can also be further partitioned into smaller coding blocks. One or more partitioning method can be applied including quadtree, binary split and ternary split. Optionally, block partition unit 203 can further partition a coding block into one or more prediction blocks to determine prediction samples. Block partition unit 203 can adopt RDO methods in the determination of partitioning of the coding block. Output parameters of block partition unit 203 includes one or more parameters indicating the partitioning of the coding block.

ME unit 204 and MC unit 205 utilize one or more decoded pictures from DPB 214 as reference picture to determine inter prediction samples of a coding block. ME unit 204 constructs one or more reference lists containing one or more reference pictures and determines one or more matching blocks in reference picture for the coding block. MC unit 205 derives prediction samples using the samples in the matching block, and calculates a difference (i.e. residual) between original samples in the coding block and the prediction samples. Output parameters of ME unit 204 indicate location of matching block including reference list index, reference index (refIdx), motion vector (MV) and etc., wherein reference list index indicates the reference list containing the reference picture in which the matching block locates, reference index indicates the reference picture in the reference list containing the matching block, and MV indicates the relative offset between the locations of the coding block and the matching block in an identical coordinate for representing locations of pixels in a picture. Output parameters of MC unit 205 are inter prediction samples of the coding block, as well as parameters for constructing the inter prediction samples, for example, weighting parameters for samples in the matching block, filter type and parameters for filtering samples in the matching block. Generally, RDO methods can be applied jointly to ME unit 204 and MC unit 205 for getting optimal matching block in rate-distortion (RD) sense and corresponding output parameters of the two units.

Specially and optionally, ME unit 204 and MC unit 205 can use the current picture containing the coding block as reference to obtain intra prediction samples of the coding block. In this document, by intra prediction is meant that only the data in a picture containing a coding block is employed as reference for derive prediction samples of the coding block. In this case, ME unit 204 and MC unit 205 use reconstructed part in the current picture, wherein the reconstructed part is from the output of adder 212. An example is that the encoder allocates a picture buffer to (temporally) store output data of adder 212. Another method for the encoder is to reserve a special picture buffer in DPB 214 to keep the data from adder 212.

Intra prediction unit 206 uses reconstructed part of the current picture containing the coding block as reference to obtain intra prediction samples of the coding block. Intra prediction unit 206 takes reconstructed neighboring samples of the coding block as input of a filter for deriving intra prediction samples of the coding block, wherein the filter can be an interpolation filter (e.g. for calculating prediction samples when using angular intra prediction), a low-pass filter (e.g. for calculating DC value), or cross-component filters to derive a prediction value of a (color) component using already coded (color) component. Specially, intra prediction unit 206 can perform searching operations to get a matching block of the coding block in a range of reconstructed part in the current picture, and set samples in the matching block as intra prediction samples of the coding block. Intra prediction unit 206 invokes RDO methods to determine an intra prediction mode (i.e. a method for calculating intra prediction samples for a coding block) and corresponding prediction samples. Besides intra prediction samples, output of intra prediction unit 206 also includes one or more parameters indicating an intra prediction mode in use.

Adder 207 is configured to calculate difference between original samples and prediction samples of a coding block. Output of adder 207 is residual of the coding block. The residual can be represented as an N×M 2-dimentional matrix, wherein N and M are two positive integers, and N and M can be of equal or different values.

Transform unit 208 takes the residual as its input. Transform unit 208 may apply one or more transform methods to the residual. From the perspective of signal processing, a transform method can be represented by a transform matrix. Optionally, transform unit 208 may determine to use a rectangle block (in this document, square block is a special case of a rectangle block) with the same shape and size as that of the coding block to be a transform block for the residual. Optionally, transform unit 208 may determine to partition the residual into several rectangle blocks (may also including a special case that width or height of a rectangle block is one sample) and the perform transform operations on the several rectangle sequentially, for example, according to a default order (e.g. raster scan order), a predefined order (e.g. an order corresponding to a prediction mode or a transform method), a selected order for several candidate orders. Transform unit 208 may determine to perform multiple transforms on the residual. For example, transform unit 208 first perform a core transform on the residual, and then perform a secondary transform on coefficients obtained after finishing the core transform. Transform unit 208 may utilize RDO methods to determine transform parameter, which indicates execution manners used in transform process applied to the residual block, for example, partitioning of the residual block into transform blocks, transform matrix, multiple transforms, and etc. The transform parameter is included in output parameters of transform unit 208. Output parameters of transform unit 208 includes the transform parameter and data obtained after transforming the residual (e.g. transform coefficients) which could be represented by a 2-dimensional matrix.

Quantization unit 209 quantizes the data outputted by transform unit 208 after its transforming the residual. Quantizer used in quantization unit 209 can be one or both of scalar quantizer and vector quantizer. In most video encoders, quantization unit 209 employs scalar quantizer. Quantization step of a scalar quantizer is represented by quantization parameter (QP) in a video encoder. Generally, identical mapping between QP and quantization step is preset or predefined in an encoder and a corresponding decoder.

A value of QP, for example, picture level QP and/or block level QP, can be set according to a configuration file applied to an encoder, or be determined by a coder control unit in an encoder. For example, the coder control unit determines a quantization step of a picture and/or a block using rate control (RC) methods and then converts the quantization step into QP according to the mapping between QP and quantization step. Generally, color components (i.e. RGB components, luma and chroma components) are of different contributions to and impacts on perceptual quality, for example, human visual system (HVS) is more sensitive to luma component than chroma component. Therefore, from the perspective of bit allocation among color components, an encoder needs to get a reasonable tradeoff between coding quality and compression. To achieve an optimal tradeoff, quantization unit 209 uses different QPs to quantize color components.

An example implementation of quantization unit 209 is to determine a QP for a picture or a picture region by invoking general RC methods. Quantization unit 209 uses this QP as a QP for luma component (i.e. luma QP) for this picture or this picture region. In the example implementation of an encoder, a default chroma delta QP is available for quick calculation of a QP for a chroma component (i.e. chroma QP) of this picture or this picture region so that computational burden for determine chroma QP in RC methods can be saved. The chroma delta QP is the difference of luma QP and chroma QP, which represents a relative tradeoff in bit allocation between luma and chroma components. The default chroma delta QP can be obtained by extensive testing and experiments with video chips of various characteristics, and the most frequently used value of chroma delta QP can be burned in an encoder (as well as the corresponding decoder).

Alternatively, since a profile/tier/level specifies the maximum size of a picture supported in an encoder (and also a decoder) conforming to this profile/tier/level, various default chroma delta QPs can be set for various combinations of profile/tier/level. For example, a default chroma delta QP for RGB profile may be different from another default chroma delta QP for YUV profile. A default chroma delta QP for a first level may be different from another default chroma delta QP for a second level.

With a default chroma QP, after obtaining a luma QP, the encoder calculates a first chroma QP for a chroma component of this picture or this picture region using the default chroma QP. The encoder sets the first chroma QP equal to a sum of the luma QP and the default chroma QP.

The encoder determines whether the first chroma QP is used to code the chroma component. For example, the encoder calculates an indicating value following a quality criterion designed for represent objective or subjective quality. If this indicating value is within an allowable range, the encoder determines that the first chroma QP is used as chroma QP for the picture or the picture region. Otherwise, the encoder derives a second chroma QP for the chroma component. One method is to evaluate one or several the neighboring values around the first chroma QP for and then chooses the first QP that results in an indicating value within the allowable range, instead of invoking a computational expensive algorithm such as general rate control method with first determining bits allocated to chroma component.

Control parameter for quantization unit 209 is QP, including parameters for chroma QP. Besides directly employing the value of chroma QP as a parameter for chroma QP, the parameters for chroma QP can be a flag indicating whether the default chroma QP is used, and if not, the value of chroma delta QP equal to the difference between the QP for luma component and the chroma QP. Output of quantization unit 209 is one or more quantized transform coefficients (i.e. known as "Level") represented in a form of a 2-dimensional matrix.

Inverse quantization 210 performs scaling operations on output of quantization 209 to get reconstructed coefficients. Inverse transform unit 211 performs inverse transform on the reconstructed coefficients from inverse quantization 210 according to the transform parameter from transform unit 208. Output of inverse transform unit 211 is reconstructed residual. Specially, when an encoder determines to skip quantizing in coding a block (e.g. an encoder implements RDO methods to determine whether applying quantization to a coding block), the encoder guides the output data of transform unit 208 to inverse transform unit 211 by bypassing quantization unit 209 and inverse quantization 210.

Adder 212 takes the reconstructed residual and prediction samples of the coding block from prediction unit 202 as input, calculates reconstructed samples of the coding block, and put the reconstructed samples into a buffer (e.g. a picture buffer). For example, the encoder allocates a picture buffer to (temporally) store output data of adder 212. Another method for the encoder is to reserve a special picture buffer in DPB 214 to keep the data from adder 212.

Filtering unit 213 performs filtering operations on reconstructed picture samples in decoded picture buffer and outputs decoded pictures. Filtering unit 213 may consist of one filter or several cascading filters. For example, according to H.265/HEVC standard, filtering unit is composed of two cascading filters, i.e. deblocking filter and sample adaptive offset (SAO) filter. Filtering unit 213 may include adaptive loop filter (ALF). Filtering unit 213 may also include neural network filters. Filtering unit 213 may start filtering reconstructed samples of a picture when reconstructed samples of all coding blocks in the picture have been stored in decoded picture buffer, which can be referred to as "picture layer filtering". Optionally, an alternative implementation (referred to as "block layer filtering") of picture layer filtering for filtering unit 213 is to start filtering reconstructed samples of a coding block in a picture if the reconstructed samples are not used as reference in encoding all successive coding blocks in the picture. Block layer filtering does not require filtering unit 213 to hold filtering operations until all reconstructed samples of a picture are available, and thus saves time delay among threads in an encoder. Filtering unit 213 determines filtering parameter by invoking RDO methods. Output of filtering unit 213 is decoded samples of a picture and filtering parameter including indication information of filter, filter coefficients, filter control parameter and etc.

The encoder stores the decoded picture from filtering unit 213 in DPB 214. The encoder may determine one or more instructions applied to DPB 214, which are used to control operations on pictures in DPB 214, for example, the time length of a picture storing in DPB 214, outputting a picture from DPB 214, and etc. In some embodiments, such instructions are taken as output parameter of DPB 214.

Entropy coding unit 215 performs binarization and entropy coding on one or more coding parameters of a picture, which converts a value of a coding parameter into a code word consisting of binary symbol "0" and "1" and writes the code word into a bitstream according to a specification or a standard. The coding parameters may be classified as texture data and non-texture. Texture data are transform coefficients of a coding block, and non-texture data are the other data in the coding parameters except texture data, including output parameters of the units in the encoder, parameter set, header, supplemental information, and etc. Output of entropy coding unit 215 is a bitstream conforming to a specification or a standard.

Entropy coding unit 215 receives the output parameters from quantization unit 209, particularly the parameters for chroma QP. Specially, if the parameter for chroma QP is the chroma QP for the chroma component of the picture or the picture region, entropy coding unit 215 converts the chroma QP into a flag indicating whether default chroma delta QP is used, and, if not, a chroma delta QP set equal to a difference between the luma QP and the chroma QP. If the parameters for chroma QP are the above flag and (if needed) chroma delta QP, entropy coding unit 215 does not invoke such conversion operations on the parameters for chroma QP.

FIGS. 4A-4C are diagrams illustrating examples of syntax structures for representing parameters of chroma QP in a bitstream, wherein a syntax in bold in FIGS. 4A-4C is a syntax element represented by a string of one or more bits existing in the bitstream, and u(1) and se(v) are two coding method with the same function as that in published standards like H.264/AVC and H.265/HEVC.

The semantics of the syntax elements in FIG. 4A are presented as follows.

default_chroma_qp_offset_flag equal to 1 specifies the absence of cb_qp_offset and cr_qp_offset in the bitstream. default_chroma_qp_offset_flag equal to 0 specifies the presence of cb_qp_offset and cr_qp_offset in the bitstream.

cb_qp_offset and cr_qp_offset specify the offsets to the luma QP for deriving chroma QPs for Cb and Cr components, respectively. The values of cb_qp_offset and cr_qp_offset shall be in the range of −12 to +12, inclusive. When not present, the value of cb_qp_offset is inferred to a first default value, and the value of cr_qp_offset is inferred to a second default value.

The first default value and the second default value can be the same value or two different values.

The semantics of the syntax elements in FIG. 4B are presented as follows. Using this syntax structure, an encoder has an ability to separately set default chroma QPs for different chroma components.

default_cb_qp_offset_flag equal to 1 specifies the absence of cb_qp_offset in the bitstream. default_chroma_qp_offset_flag equal to 0 specifies the presence of cb_qp_offset in the bitstream.

cb_qp_offset specifies the offset to the luma QP for deriving chroma QP for Cb component. The value of cb_qp_offset shall be in the range of −12 to +12, inclusive. When not present, the value of cb_qp_offset is inferred to a first default value.

default_cr_qp_offset_flag equal to 1 specifies the absence of cr_qp_offset in the bitstream. default_chroma_qp_offset_flag equal to 0 specifies the presence of cr_qp_offset in the bitstream.

cr_qp_offset specifies the offset to the luma QP for deriving chroma QP for Cb component. The value of cr_qp_offset shall be in the range of −12 to +12, inclusive. When not present, the value of cr_qp_offset is inferred to a first default value.

The first default value and the second default value can be the same value or two different values.

The semantics of the syntax elements in FIG. 4C are presented as follows. Using this syntax structure, an encoder has an ability to separately set default chroma QPs for different chroma components, while keeping the ability to turn on default QPs for different chroma components simultaneously.

default_chroma_qp_offset_flag equal to 1 specifies the absence of default_cb_qp_offset_flag, cb_qp_offset, default_cr_qp_offset_flag and cr_qp_offset in the bitstream. default_chroma_qp_offset_flag equal to 0 specifies the presence of default_cb_qp_offset_flag, cb_qp_offset, default_cr_qp_offset_flag and cr_qp_offset in the bitstream.

default_cb_qp_offset_flag equal to 1 specifies the absence of cb_qp_offset in the bitstream. default_chroma_qp_offset_flag equal to 0 specifies the presence of cb_qp_offset in the bitstream. When not present, the value of default_cb_qp_offset_flag is inferred to be 1.

cb_qp_offset specifies the offset to the luma QP for deriving chroma QP for Ch component. The value of cb_qp_offset may be in the range of −12 to +12, inclusive. When not present, the value of cb_qp_offset is inferred to a first default value.

default_cr_qp_offset_flag equal to 1 specifies the absence of cr_qp_offset in the bitstream. default_chroma_qp_offset_flag equal to 0 specifies the presence of cr_qp_offset in the bitstream. When not present, the value of default_cr_qp_offset_flag is inferred to be 1.

cr_qp_offset specifies the offset to the luma QP for deriving chroma QP for Ch component. The value of cr_qp_offset shall be in the range of −12 to +12, inclusive. When not present, the value of cr_qp_offset is inferred to a first default value.

The first default value and the second default value can be the same value or two different values.

In one example, entropy coding unit 215 codes the parameters for chroma QP in a data unit of a parameter set. The parameter set is applied in encoding a picture or a picture region (e.g. tile group), for example, sequence parameter set (SPS), picture parameter set (PPS), adaptive parameter set (APS). Entropy coding unit 215 sets a value of parameter set identifier in a header of a tile group equal to the identifier of the parameter set. In this way, the parameter set will be activated in decoding the tile group.

In another example, entropy coding unit 215 codes the parameters for chroma QP in a data unit containing a header of a tile group. In this way, if another set of parameters for chroma QP is available in a parameter set activated in decoding the tile group, the parameters for chroma QP in the header of the tile group overrides the set of parameters for chroma QP in the parameter set in decoding the tile group.

Embodiment 2

Figure 5:
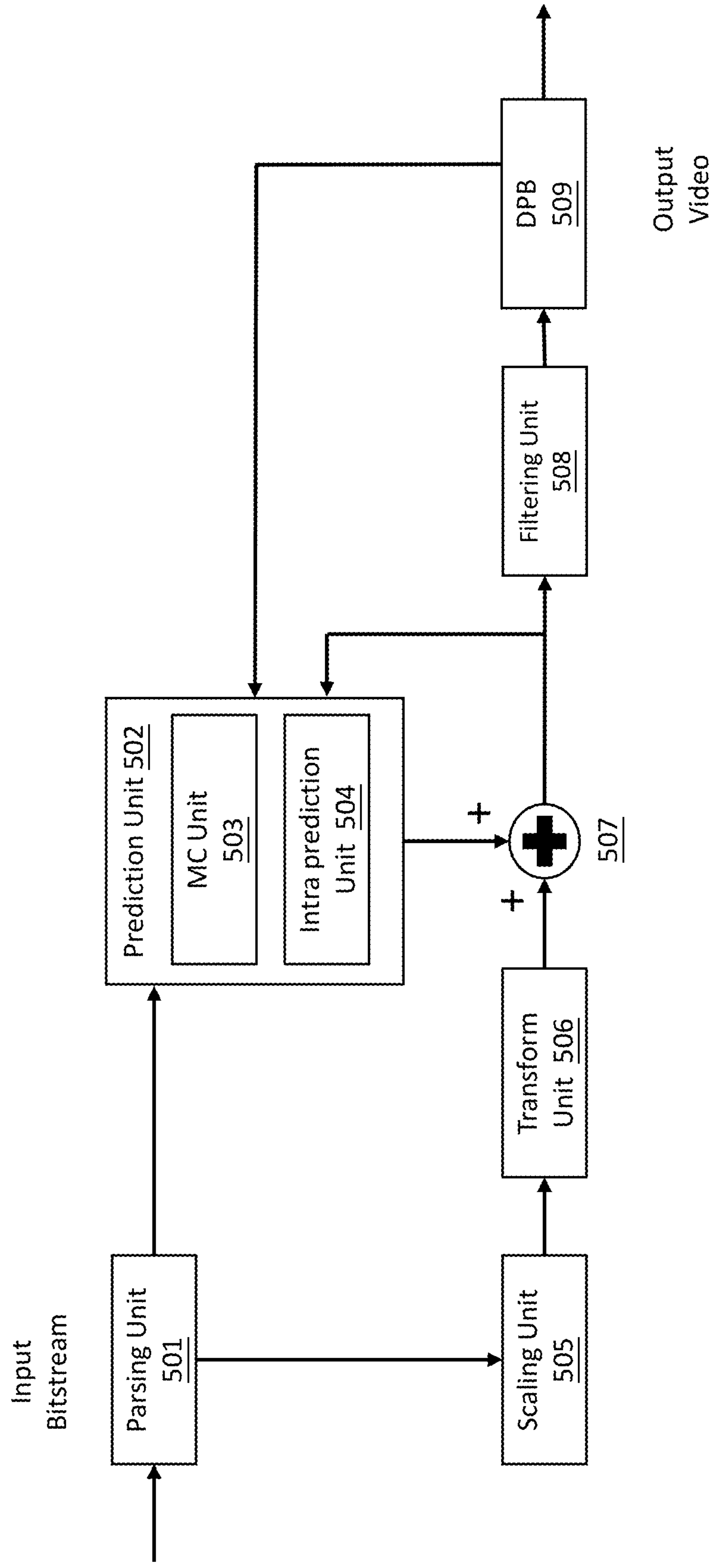
FIG. 5 is a diagram illustrating an example video or picture decoder that implements the methods in this disclosure.

FIG. 5 is a diagram illustrating a decoder utilizing the method in this document in decoding a bitstream generated by the aforementioned encoder in embodiment 1. Input of the decoder is a bitstream, and output of the decoder is decoded video or picture obtained by decoding the bitstream.

Parsing unit 501 in the decoder parses the input bitstream. Parsing unit 501 uses entropy decoding methods and binarization methods specified in a standard to convert each code word in the bitstream consisting of one or more binary symbols (i.e. “0” and “1”) to a numerical value of a corresponding parameter. Parsing unit 501 also derives parameter value according to one or more available parameters. For example, when there would be a flag in the bitstream indicating a decoding block is the first one in a picture, parsing unit 501 setting an address parameter, which indicates an address of the first decoding block of a picture region, to be 0.

Parsing unit 501 parses one or more data units, for example, parameter set data unit, tile group data unit, in the bitstream to get parameters for chroma QP, includes a flag indicating whether default chroma delta QP is used, and, if not, a chroma delta QP which is a difference between the luma QP and the chroma QP.

FIGS. 4A-4C is a diagram illustrating examples of syntax structures for representing parameters for chroma QP, wherein a syntax in bold in FIGS. 4A-4C is a syntax element represented by a string of one or more bits existing in the bitstream, and u(1) and se(v) are two decoding method with the same function as that in published standards like H.264/AVC and H.265/HEVC.

FIGS. 4A, 4B and 4C are diagrams illustrating examples of syntax structures for parsing the parameters for chroma QP in the bitstream by parsing unit 501. The syntax structures in FIGS. 4A, 4B and 4C can be separately parsed and obtained from one or more data units in the bitstream. Optionally, the data unit can be a parameter set data unit. The parameter set is applied in decoding a picture or a picture region (e.g. tile group), for example, sequence parameter set (SPS), picture parameter set (PPS), adaptive parameter set (APS). Parsing unit 501 gets an identifier value of parameter set identifier from a tile group header, activates the parameter set with its identifier equal to the identifier value, and obtains chroma QP from the activated parameter set. Optionally, the data unit can be a data unit containing tile group header. In addition, if parsing unit 501 obtains the parameters for chroma QP first from a parameter set and then tile group header, parsing unit 501 overwrites chroma QP obtained from the parameter set by chroma QP obtained from tile group. The decoder uses this chroma QP in decoding the chroma component.

The semantics of the syntax elements in FIG. 4A are presented as follows.

default_chroma_qp_offset_flag equal to 1 specifies the absence of cb_qp_offset and cr_qp_offset in the bitstream. default_chroma_qp_offset_flag equal to 0 specifies the presence of cb_qp_offset and cr_qp_offset in the bitstream.

cb_qp_offset and cr_qp_offset specify the offsets to the luma QP for deriving chroma QPs for Cb and Cr components, respectively. The values of cb_qp_offset and cr_qp_offset may be in the range of −12 to +12, inclusive. When not present, the value of cb_qp_offset is inferred to a first default value, and the value of cr_qp_offset is inferred to a second default value.

The first default value and the second default value can be the same value or two different values.

The semantics of the syntax elements in FIG. 4B are presented as follows. Using this syntax structure, an encoder has an ability to separately set default chroma QPs for different chroma components.

default_cb_qp_offset_flag equal to 1 specifies the absence of cb_qp_offset in the bitstream. default_chroma_qp_offset_flag equal to 0 specifies the presence of cb_qp_offset in the bitstream.

cb_qp_offset specifies the offset to the luma QP for deriving chroma QP for Cb component. The value of cb_qp_offset shall be in the range of −12 to +12, inclusive. When not present, the value of cb_qp_offset is inferred to a first default value.

default_cr_qp_offset_flag equal to 1 specifies the absence of cr_qp_offset in the bitstream. default_chroma_qp_offset_flag equal to 0 specifies the presence of cr_qp_offset in the bitstream.

cr_qp_offset specifies the offset to the luma QP for deriving chroma QP for Cb component. The value of cr_qp_offset shall be in the range of −12 to +12, inclusive. When not present, the value of cr_qp_offset is inferred to a first default value.

The first default value and the second default value can be the same value or two different values.

The semantics of the syntax elements in FIG. 4C are presented as follows. Using this syntax structure, an encoder has an ability to separately set default chroma QPs for different chroma components, while keeping the ability to turn on default QPs for different chroma components simultaneously.

default_chroma_qp_offset_flag equal to 1 specifies the absence of default_cb_qp_offset_flag, cb_qp_offset, default_cr_qp_offset_flag and cr_qp_offset in the bitstream. default_chroma_qp_offset_flag equal to 0 specifies the presence of default_cb_qp_offset_flag, cb_qp_offset, default_cr_qp_offset_flag and cr_qp_offset in the bitstream.

default_cb_qp_offset_flag equal to 1 specifies the absence of cb_qp_offset in the bitstream. default_chroma_qp_offset_flag equal to 0 specifies the presence of cb_qp_offset in the bitstream. When not present, the value of default_cb_qp_offset_flag is inferred to be 1.

cb_qp_offset specifies the offset to the luma QP for deriving chroma QP for Cb component. The value of cb_qp_offset shall be in the range of −12 to +12, inclusive. When not present, the value of cb_qp_offset is inferred to a first default value.

default_cr_qp_offset_flag equal to 1 specifies the absence of cr_qp_offset in the bitstream. default_chroma_qp_offset_flag equal to 0 specifies the presence of cr_qp_offset in the bitstream. When not present, the value of default_cr_qp_offset_flag is inferred to be 1.

cr_qp_offset specifies the offset to the luma QP for deriving chroma QP for Cb component. The value of cr_qp_offset shall be in the range of −12 to +12, inclusive. When not present, the value of cr_qp_offset is inferred to a first default value.

The first default value and the second default value can be the same value or two different values.

Parsing unit 501 obtains chroma QP in the following steps.

Step 1: Parsing unit 501 parses an input bitstream to determine a QP for luma component of a picture or a picture region from a data unit in the bitstream. The data unit can be a tile group header, and/or one or more parameter sets. Parsing unit 501 uses the same method as that in H.266/VVC WD to calculate the luma QP (denoted as QpY).

Step 2: Parsing unit 501 obtains a flag from the data unit. The flag indicates whether default chroma delta QP is used to derive a chroma QP for a chroma component of a picture or a picture region.

Step 3: Parsing unit 501 checks whether the flag is equal to a first value (e.g. "1"), if yes, parsing unit 501 sets the chroma QP equal to a sum of QpY and a default chroma delta QP (denoted as "defaultChromaDeltaQp" and indicated by the flag. Otherwise, if the flag equal to a second value (e.g. "0"), parsing unit 501 parses the bitstream to obtain a delta chroma QP from the data unit, and setting the QP for the chroma component equal to a sum of the QP for luma component and the delta chroma QP.

If the syntax elements in FIG. 4A is used, parsing unit 501 sets the value of the flag equal to the value of default_chroma_qp_offset_flag for both Cb and Cr components. When default_chroma_qp_offset_flag equal to 1, for Cb component, parsing unit 501 sets defaultChromaDeltaQp equal to the first default value as specified in the semantics of cb_qp_offset, and sets the chroma QP for Cb component equal to QpY+defaultChromaDeltaQp; for Cr component, parsing unit 501 sets defaultChromaDeltaQp equal to the second default value as specified in the semantics of cr_qp_offset, and sets the chroma QP for Cb component equal to QpY+defaultChromaDeltaQp. When default_chroma_qp_offset_flag equal to 0, parsing unit 501 gets the value of cb_qp_offset from the data unti and sets the chroma delta QP for Cb component equal to QpY+cb_qp_offset; parsing unit 501 gets the value of cr_qp_offset from the data unit and sets chroma delta QP for Cr component equal to QpY+cr_qp_offset.

If the syntax elements in FIG. 4B is used, for Cb component, parsing unit 501 sets the flag equal to the value of default_cb_qp_offset_flag. When default_cb_qp_offset_flag equal to 1, parsing unit 501 sets defaultChromaDeltaQp equal to the first default value as specified in the semantics of cb_qp_offset, and sets the chroma QP for Cb component equal to QpY+defaultChromaDeltaQp. When default_cb_qp_offset_flag equal to 0, parsing unit 501 gets the value of cb_qp_offset from the data unit and sets the chroma delta QP for Cb component equal to QpY+cb_qp_offset. For Cr component, parsing unit 501 sets the flag equal to the value of default_cr_qp_offset_flag. When default_cr_qp_offset_flag equal to 1, parsing unit 501 sets defaultChromaDeltaQp equal to the second default value as specified in the semantics of cr_qp_offset, and sets the chroma QP for Cb component equal to QpY+defaultChromaDeltaQp. When default_cr_qp_offset_flag equal to 0, parsing unit 501 gets the value of cr_qp_offset from the data unit and sets chroma delta QP for Cr component equal to QpY+cr_qp_offset.

If the syntax elements in FIG. 4C is used, for Cr component, parsing unit 501 sets the flag equal to the value of (default_chroma_qp_offset_flag&&default_cb_qp_offset_flag). When the flag equal to 1, parsing unit 501 sets defaultChromaDeltaQp equal to the first default value as specified in the semantics of cb_qp_offset, and sets the chroma QP for Cb component equal to QpY+defaultChromaDeltaQp. When the flag equal to 0, parsing unit 501 gets the value of cb_qp_offset from the data unit and sets the chroma delta QP for Cb component equal to QpY+cb_qp_offset. For Cr component, parsing unit 501 sets the flag equal to the value of (default_chroma_qp_offset_flag && default_cr_qp_offset_flag). When the flag equal to 1, parsing unit 501 sets defaultChromaDeltaQp equal to the second default value as specified in the semantics of cr_qp_offset, and sets the chroma QP for Cb component equal to QpY+defaultChromaDeltaQp. When the flag equal to 0, parsing unit 501 gets the value of cr_qp_offset from the data unit and sets chroma delta QP for Cr component equal to QpY+cr_qp_offset.

Corresponding to the implementation of the encoder, the default chroma delta QP can be obtained by extensive testing and experiments with video chips of various characteristics, and the most frequently used value of chroma delta QP can be burned in a decoder (as well as the corresponding encoder). That is, default chroma delta QPs, i.e. the first default value of cb_qp_offset and the second default value of cr_qp_offset, can be fixed values preset in a codec.

Alternatively, since a profile/tier/level specifies the maximum size of a picture supported in a decoder conforming to this profile/tier/level, various default chroma delta QPs can be set for various combinations of profile/tier/level. For example, a default chroma delta QP for RGB profile may be different from another default chroma delta QP for YUV profile. A default chroma delta QP for a first level may be different from another default chroma delta QP for a second level. Parsing unit 501 gets the first default value of cb_qp_offset and the second default value of cr_qp_offset according to the profile/tier/level information specified in the input bitstream.

Take Cb component for example. An alternative implementation of step 3 is that parsing unit 501 determines the value of cb_qp_offset according to the flag. When the flag equal to the first value, parsing unit 501 sets cb_qp_offset to the first default value; otherwise, parsing unit 501 gets the value of cb_qp_offset from the data unit. Finally, parsing unit 501 sets the chroma QP for Cb component equal to QpY+cb_qp_offset. Parsing unit 501 also applies the same steps as above to determine the chroma QP for Cr component.

Parsing unit 501 passes the above chroma QP values to the other units in the decoder and used in decoding the corresponding chroma component.

Parsing unit 501 passes one or more prediction parameters for deriving prediction samples of a decoding block to prediction unit 502. In this document, the prediction parameters include output parameters of partitioning unit 201 and prediction unit 202 in the aforementioned encoder.

Parsing unit 501 passes one or more residual parameters for reconstructing residual of a decoding block to scaling unit 505 and transform unit 506. In this document, the residual parameters include output parameters of transform unit 208 and quantization unit 209 and one or more quantized coefficients (i.e. "Levels") outputted by quantization unit 209 in the aforementioned encoder.

Parsing unit 501 passes filtering parameter to filtering unit 508 for filtering (e.g. in-loop filtering) reconstructed samples in a picture.

Prediction unit 502 derives prediction samples of a decoding block according to the prediction parameters. Prediction unit 502 is composed of MC unit 503 and intra prediction unit 504. Input of prediction unit 502 may also include reconstructed part of a current decoding picture outputted from adder 507 (which is not processed by filtering unit 508) and one or more decoded pictures in DPB 509.

When the prediction parameters indicate inter prediction mode is used to derive prediction samples of the decoding block, prediction unit 502 employs the same approach as that for ME unit 204 in the aforementioned encoder to construct one or more reference picture lists. A reference list contains one or more reference pictures from DPB 509. MC unit 503 determines one or more matching blocks for the decoding block according to indication of reference list, reference index and MV in the prediction parameters, and uses the same method as that in MC unit 205 in the aforementioned encoder to get inter prediction samples of the decoding block. Prediction unit 502 outputs the inter prediction samples as the prediction samples of the decoding block.

Specially and optionally, MC unit 503 may use the current decoding picture containing the decoding block as reference to obtain intra prediction samples of the decoding block. In this document, by intra prediction is meant that only the data in a picture containing a coding block is employed as reference for derive prediction samples of the coding block. In this case, MC unit 503 use reconstructed part in the current picture, wherein the reconstructed part is from the output of adder 507 and is not processed by filtering unit 508. For example, the decoder allocates a picture buffer to (temporally) store output data of adder 507. Another method for the decoder is to reserve a special picture buffer in DPB 509 to keep the data from adder 507.

When the prediction parameters indicate intra prediction mode is used to derive prediction samples of the decoding block, prediction unit 502 employs the same approach as that for intra prediction unit 206 in the aforementioned encoder to determine reference samples for intra prediction unit 504 from reconstructed neighboring samples of the decoding block. Intra prediction unit 504 gets an intra prediction mode (i.e. DC mode, Planar mode, or an angular prediction mode) and derives intra prediction samples of the decoding block using reference samples following specified process of the intra prediction mode. Note that identical derivation process of an intra prediction mode is implemented in the aforementioned encoder (i.e. intra prediction unit 206) and the decoder (i.e. intra prediction unit 504). Specially, if the prediction parameters indicate a matching block (including its location) in the current decoding picture (which contains the decoding block) for the decoding block, intra prediction unit 504 use samples in the matching block to derive the intra prediction samples of the decoding block. For example, intra prediction unit 504 sets intra prediction samples equal to the samples in the matching block. Prediction unit 502 sets prediction samples of the decoding block equal to intra prediction samples outputted by intra prediction unit 504.

The decoder passes QP, including luma QP and chroma QP, and quantized coefficients to scaling unit 505 for process of inverse quantization to get reconstructed coefficients as output. The decoder feeds the reconstructed coefficients from scaling unit 505 and transform parameter in the residual parameter (i.e. transform parameter in output of transform unit 208 in the aforementioned encoder) into transform unit 506. Specially, if the residual parameter indicates to skip scaling in decoding a block, the decoder guides the coefficients in the residual parameter to transform unit 506 by bypassing scaling unit 505.

Transform unit 506 performs transform operations on the input coefficients following a transform process specifies in a standard. Transform matrix used in transform unit 506 is the same as that used in inverse transform unit 211 in the aforementioned encoder. Output of transform unit 506 is a reconstructed residual of the decoding block.

Generally, since only decoding process is specified in a standard, from the perspective view of a video coding standard, process and related matrix in decoding process is specified as "transform process" and "transform matrix" in a standard text. Thus, in this document, the description on the decoder names the unit implementing a transform process specified in a standard text as "transform unit" to coincide with the standard. However, this unit can always be named as "inverse transform unit" based on the consideration of taking decoding process as an inverse process of encoding.

Adder 507 takes the reconstructed residual in output of transform unit 506 and the prediction samples in output of prediction unit 502 as input data, calculates reconstructed samples of the decoding block. Adder 507 stores the reconstructed samples into a picture buffer. For example, the decoder allocates a picture buffer to (temporally) store output data of adder 507. Another method for the decoder is to reserve a special picture buffer in DPB 509 to keep the data from adder 507.

The decoder passes filtering parameter from parsing unit 501 to filtering unit 508. The filtering parameter for filtering 508 is identical to the filtering parameter in the output of filtering unit 213 in the aforementioned encoder. The filtering parameter includes indication information of one or more filters to be used, filter coefficients and filtering control parameter. Filtering unit 508 performs filtering process using the filtering parameter on reconstructed samples of a picture stored in decoded picture buffer and outputs a decoded picture. Filtering unit 508 may consist of one filter or several cascading filters. For example, according to H.265/HEVC standard, filtering unit is composed of two cascading filters, i.e. deblocking filter and sample adaptive offset (SAO) filter. Filtering unit 508 may include adaptive loop filter (ALF). Filtering unit 508 may also include neural network filters. Filtering unit 508 may start filtering reconstructed samples of a picture when reconstructed samples of all coding blocks in the picture have been stored in decoded picture buffer, which can be referred to as "picture layer filtering". Optionally, an alternative implementation (referred to as "block layer filtering") of picture layer filtering for filtering unit 508 is to start filtering reconstructed samples of a coding block in a picture if the reconstructed samples are not used as reference in decoding all successive coding blocks in the picture. Block layer filtering does not require filtering unit 508 to hold filtering operations until all reconstructed samples of a picture are available, and thus saves time delay among threads in a decoder.

The decoder stores the decoded picture outputted by filtering unit 508 in DPB 509. In addition, the decoder may perform one or more control operations on pictures in DPB 509 according to one or more instructions outputted by parsing unit 501, for example, the time length of a picture storing in DPB 509, outputting a picture from DPB 509, and etc.

Embodiment 3

Figure 6:
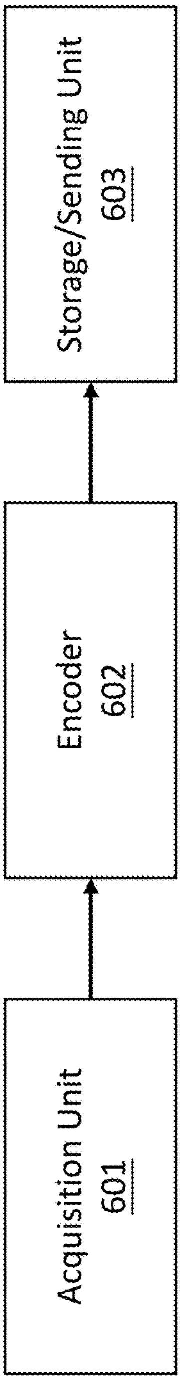
FIG. 6 is a diagram illustrating a first example device including at least the example encoder described in this disclosure.

FIG. 6 is a diagram illustrating a first example device containing at least the example video encoder or picture encoder as illustrated in FIG. 2.

Acquisition unit 601 captures video and picture. Acquisition unit 601 may be equipped with one or more cameras for shooting a video or a picture of nature scene. Optionally, acquisition unit 601 may be implemented with a camera to get depth video or depth picture. Optionally, acquisition unit 601 may include a component of an infrared camera. Optionally, acquisition unit 601 may be configured with a remote sensing camera. Acquisition unit 601 may also be an apparatus or a device of generating a video or a picture by scanning an object using radiation.

Optionally, acquisition unit 601 may perform pre-processing on video or picture, for example, automatic white balance, automatic focusing, automatic exposure, backlight compensation, sharpening, denoising, stitching, up-sampling/down sampling, frame-rate conversion, virtual view synthesis, and etc.

Acquisition unit 601 may also receive a video or picture from another device or processing unit. For example, acquisition unit 601 can be a component unit in a transcoder. The transcoder feeds one or more decoded (or partial decoded) pictures to acquisition unit 601. Another example is that acquisition unit 601 get a video or picture from another device via a data link to that device.

Note that acquisition unit 601 may be used to capture other media information besides video and picture, for example, audio signal. Acquisition unit 601 may also receive artificial information, for example, character, text, computer-generated video or picture, and etc.

Encoder 602 is an implementation of the example encoder illustrated in FIG. 2 or the source device in FIG. 9. Input of encoder 602 is the video or picture outputted by acquisition unit 601. Encoder 602 encodes the video or picture and outputs generated a video or picture bitstream.

Storage/Sending unit 603 receives the video or picture bitstream from encoder 602, and performs system layer processing on the bitstream. For example, storage/sending unit 603 encapsulates the bitstream according to transport standard and media file format, for example, e.g. MPEG-2 TS, ISOBMFF, DASH, MMT, and etc. Storage/Sending unit 603 stores the transport stream or media file obtained after encapsulation in memory or disk of the first example device, or sends the transport stream or media file via wireline or wireless networks.

Note that besides the video or picture bitstream from encoder 602, input of storage/sending unit 603 may also include audio, text, image, graphic, and etc. Storage/sending unit 603 generates a transport or media file by encapsulating such different types of media bitstreams.

The first example device described in this embodiment can be a device capable of generating or processing a video (or picture) bitstream in applications of video communication, for example, mobile phone, computer, media server, portable mobile terminal, digital camera, broadcasting device, CDN (content distribution network) device, surveillance camera, video conference device, and etc.

Embodiment 4

Figure 7:
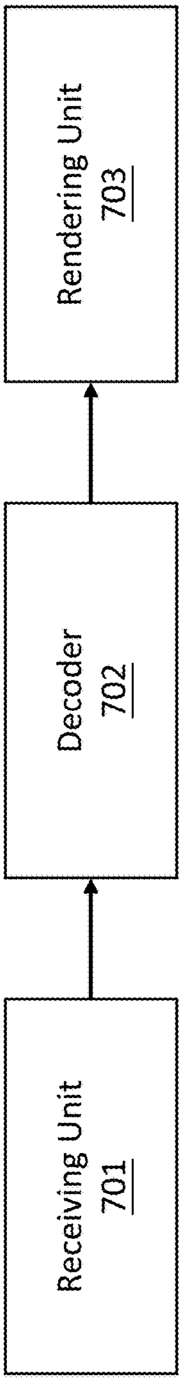
FIG. 7 is a diagram illustrating a second example device including at least the example decoder described in this disclosure.

FIG. 7 is a diagram illustrating a second example device containing at least the example video decoder or picture decoder as illustrated in FIG. 5.

Receiving unit 701 receives video or picture bitstream by obtaining bitstream from wireline or wireless network, by reading memory or disk in an electronic device, or by fetching data from other device via a data link.

Input of receiving unit 701 may also include transport stream or media file containing video or picture bitstream. Receiving unit 701 extracts video or picture bitstream from transport stream or media file according to specification of transport or media file format.

Receiving unit 701 outputs and passes video or picture bitstream to decoder 702. Note that besides video or picture bitstream, output of receiving unit 701 may also include audio bitstream, character, text, image, graphic and etc. Receiving unit 701 passes the output to corresponding processing units in the second example device. For example, receiving unit 701 passes the output audio bitstream to audio decoder in this device.

Decoder 702 is an implementation of the example decoder illustrated in FIG. 5. Input of encoder 702 is the video or picture bitstream outputted by receiving unit 701. Decoder 702 decodes the video or picture bitstream and outputs decoded video or picture.

Rendering unit 703 receives the decoded video or picture from decoder 702. Rendering unit 703 presents the decoded video or picture to viewer. Rendering unit 703 may be a component of the second example device, for example, a screen. Rendering unit 703 may also be a separate device from the second example device with a data link to the second example device, for example, projector, monitor, TV set, and etc. Optionally, rendering 703 performs post-processing on the decoded video or picture before presenting it to viewer, for example, automatic white balance, automatic focusing, automatic exposure, backlight compensation, sharpening, denoising, stitching, up-sampling/down sampling, frame-rate conversion, virtual view synthesis, and etc.

Note that besides decoded video or picture, input of rendering unit 703 can be other media data from one or more units of the second example device, for example, audio, character, text, image, graphic, and etc. Input of rendering unit 703 may also include artificial data, for example, lines and marks drawn by a local teacher on slides for attracting attention in remote education application. Rendering unit 703 composes the different types of media together and then presented the composition to viewer.

The second example device described in this embodiment can be a device capable of decoding or processing a video (or picture) bitstream in applications of video communication, for example, mobile phone, computer, set-top box, TV set, HMD, monitor, media server, portable mobile terminal, digital camera, broadcasting device, CDN (content distribution network) device, surveillance, video conference device, and etc.

Embodiment 5

Figure 8:
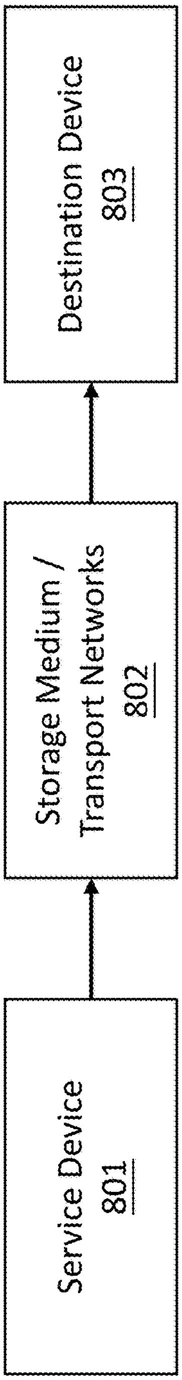
FIG. 8 is a diagram illustrating an electronic system including the first example device and the second example device.

FIG. 8 is a diagram illustrating an electronic system containing the first example device in FIG. 6 and the second example device in FIG. 7.

Service device 801 is the first example device in FIG. 6.

Storage medium/transport networks 802 may include internal memory resource of a device or electronic system, external memory resource that is accessible via a data link, data transmission network consisting of wireline and/or wireless networks. Storage medium/transport networks 802 provides storage resource or data transmission network for storage/sending unit 603 in service device 801.

Destination device 803 is the second example device in FIG. 7. Receiving unit 701 in destination device 803 receives a video or picture bitstream, a transport stream containing video or picture bitstream or a media file containing video or picture bitstream from storage medium/transport networks 802.

The electronic system described in this embodiment can be a device or system capable of generating, storing or transporting, and decoding a video (or picture) bitstream in applications of video communication, for example, mobile phone, computer, IPTV systems, OTT systems, multimedia systems on Internet, digital TV broadcasting system, video surveillance system, potable mobile terminal, digital camera, video conference systems, and etc.

In an embodiment, specific examples in the embodiment may refer to examples described in the abovementioned embodiments and exemplary implementation methods, and will not be elaborated in the embodiment.

Obviously, those skilled in the art should know that each module or each act of the present document may be implemented by a universal computing apparatus, and the modules or acts may be concentrated on a single computing apparatus or distributed on a network formed by multiple computing apparatuses, and may optionally be implemented by program codes executable for the computing apparatuses, so that the modules or acts may be stored in a storage apparatus for execution with the computing apparatuses, the shown or described acts may be executed in sequences different from those shown or described here in some circumstances, or may form each integrated circuit module respectively, or multiple modules or acts therein may form a single integrated circuit module for implementation. As a consequence, the disclosed techniques are not limited to any specific hardware and software combination.

FIG. 1A shows a flowchart for an example method 100 of processing visual information. The method may be implemented by a decoder apparatus that generates video or picture frames from a compressed bitstream representation using the method 100.

The method 100 includes parsing (102) a bitstream to determine a quantization parameter (QP) for a luma component of a region of the visual information from a data unit of a parameter set included in the bitstream, determining (104) a flag from the data unit of the parameter set, determining (106), in a case that the flag is equal to a first value, a QP for a chroma component of the region as a first function of the QP for the luma component and a default chroma delta QP indicated by the flag, determining (108), in a case that the flag is equal to a second value, the QP for the chroma component of the region by (a) obtaining (110) a delta chroma QP from the data unit, and (b) determining (112) the QP for the chroma component as a second function of the QP for the luma component and the delta chroma QP, and decoding (114) the chroma component using the QP for the chroma component in a case that the parameter set is activated for decoding the region.

As indicated by the dashed lines for the boxes corresponding to 106 and 108, it will be appreciated that a video decoding apparatus, during the operation of parsing (102), for a given region of video, when the video decoding apparatus parses to obtain the flag, the value of flag may trigger either step 106 (that the flag is equal to a first value) or the situation of step 108 (that the flag is equal to a second value that is different from the first value), but not both. It is also possible that, in some cases, a flag may simply not be included for a region (e.g., which is encoded without using the benefit of the cross-component QP coding described in the present document). Accordingly, the method 100 may be executed either by implementing step 106, or step 108, but not both for a same region of video being decoded.

Figure 1B:
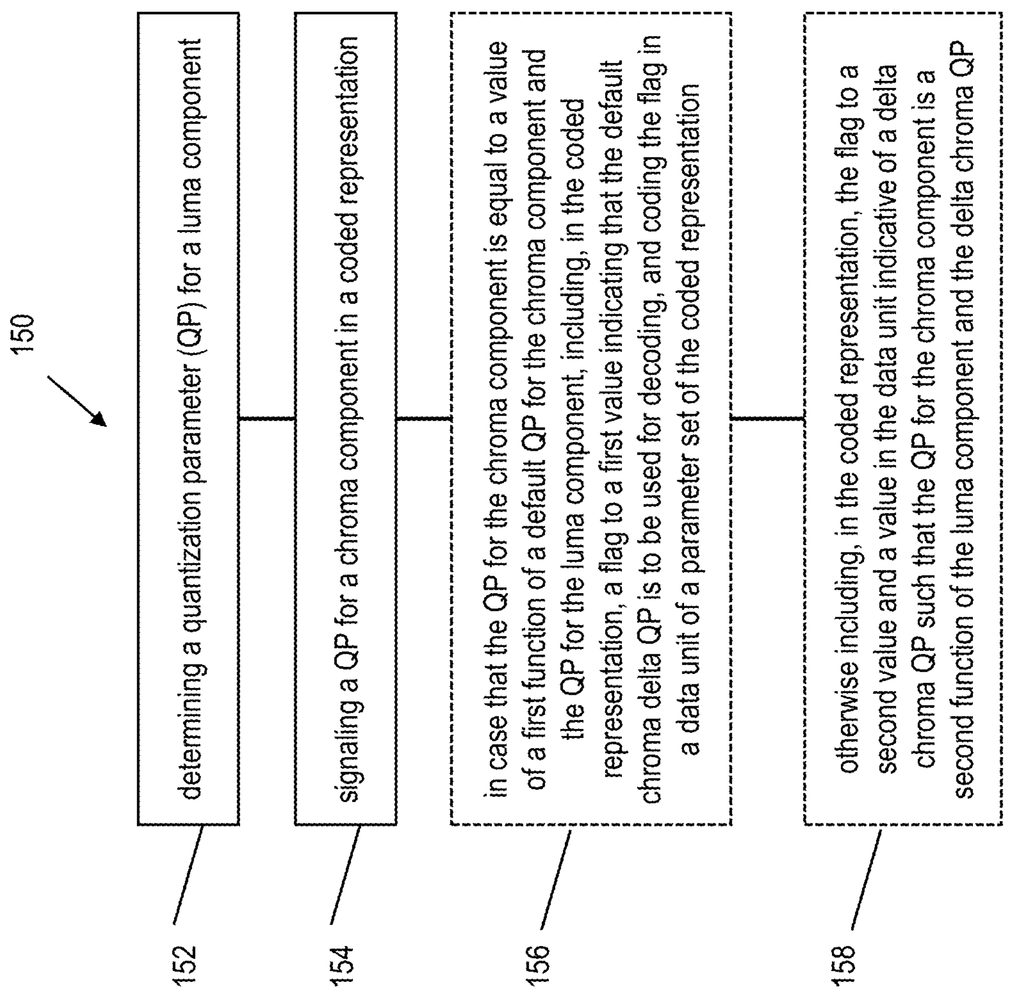
FIG. 1B is a flowchart for an example method of visual information encoding.

FIG. 1B shows a flowchart for an example method 150. The method 150 includes determining (152) a QP for a luma component of a region of the visual information, signaling (154) a QP for a chroma component in a coded representation of the visual information as: in case that the QP for the chroma component is equal to a value of a first function of a default QP for the chroma component and the QP for the luma component, including (156), in the coded representation, a flag to a first value indicating that the default chroma delta QP is to be used for decoding, and coding the flag in a data unit of a parameter set of the coded representation, and otherwise including (158), in the coded representation, the flag to a second value and a value in the data unit indicative of a delta chroma QP such that the QP for the chroma component is a second function of the luma component and the delta chroma QP.

It will be appreciated that a video encoding apparatus that implements the method 150 may implement either step 156 for encoding a video region or step 158, but not both for a same video region. In some cases, a video encoder that does not perform encoding of a region using the cross-component QP signalling technique described in the present document may not implement both steps 156 and 158. Accordingly, as indicated by dashed borders in FIG. 1B, steps 156 and 158 may be implemented as two different, mutually exclusive, options of encoding a video region.

In some embodiments, in methods 100, 150, the first function is an addition function. Therefore, the delta chroma QP may be summed with the luma QP to obtain chroma QP value. Other possibilities of the first function include contextually coding the delta chroma QP and using contextual information (e.g., neighboring blocks) to obtain chroma QP. In some embodiments, the first function may be based on a look-up table or a mapping of delta chroma QP values to chroma QP values. FIGS. 4A-4C show example embodiments of techniques described in methods 100, 150.

Similar to the first function, in various embodiments, the second function may also be the summation or addition function or may be based on contextual or table based representation of values of luma QP and delta chroma QPs.

As previously described, the region used in methods 100, 150 may correspond to a picture, or size of a video picture, or may be a smaller portion of the picture.

In some embodiments, in the methods 100, 150, the default chroma delta QP indicated by the flag is determined based on a mapping, and wherein the mapping remains unchanged in the bitstream. Alternatively, the mapping may be changed by a signaling in the bitstream at picture, tile or sequence level.

The methods 100, 150 may be implemented to encode (or decode) a single picture or image or a sequence of pictures, e.g., using predictive coding.

The encoder, described with respect to FIG. 2, may implement the method 150 during video encoding. For example, the technique described in FIG. 3 may be used to partition a video into different regions (e.g., tile groups). The Quantization unit 209 may determine luma and chroma components and may include the corresponding indication in a bitstream, as described with respect to the method 150. Some example syntax structures are shown in FIGS. 4A-4C.

The decoder described with respect to FIG. 5 may implement the method 100. For example, the parsing unit may parse for the flag indicative of chroma QP. FIGS. 4A-4C show various examples of bitstream syntaxes that may be parsed by the decoder.

In some embodiments, a video encoder apparatus may include a processor configured to implement bitstream generations or encoding techniques described in the present document.

In some embodiments, a video decoder apparatus may include a processor configured to implement bitstream decoding described in the present document. The decoder device may further process the decoded visual information to generate a displayable image (or a sequence of images).

Various apparatus embodiments described herein are only for illustrative purpose and are not intended to limit the implementation of encoding and decoding operations described in the present document.

INDUSTRIAL APPLICABILITY

From the above description, it can be known that a chroma QP can be obtained, at least as a candidate chroma QP, using a default chroma delta QP once a QP for luma component is determined. By means of the above steps, computational burden of an encoder to determine chroma QP is alleviated. Therefore, the drawback in the existing methods is solved by using the aforementioned encoder to generate a bitstream, and the aforementioned decoder to decode the bitstream.

FIG. 8 shows an example apparatus 800 that may be used to implement encoder-side or decoder-side techniques described in the present document. The apparatus 800 includes a processor 802 that may be configured to perform the encoder-side or decoder-side techniques or both. The apparatus 800 may also include a memory (not shown) for storing processor-executable instructions and for storing the video bitstream and/or display data. The apparatus 800 may include video processing circuitry (not shown), such as transform circuits, arithmetic coding/decoding circuits, look-up table based data coding techniques and so on. The video processing circuitry may be partly included in the processor and/or partly in other dedicated circuitry such as graphics processors, field programmable gate arrays (FPGAs) and so on.

It will be appreciated that the present document provides various techniques that can be used by video or image encoder and decoder embodiments to differentially encode chroma quantization parameters based on information from luma quantization parameters. In one example aspect, the disclosed techniques may be used to perform a trade-off between visual quality of coded visual information with number of bits used for chroma component coding. In one advantageous aspect, the decision to trade off bit precision between chroma and luma components may be performed at sub-picture boundaries, and signaled according to delta chroma QP values.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing visual information, comprising:

parsing a bitstream to determine a quantization parameter (QP) for a luma component of a region of the visual information from a data unit of a parameter set that is activated for decoding the region;

determining a flag from the data unit of the parameter set, the flag having either a first value indicating an absence of an offset to the QP for the luma component in the bitstream or a second value indicating a presence of the offset to the QP for the luma component in the bitstream;

determining, in a case that the flag is equal to the first value, a QP for a chroma component of the region as a first function of the QP for the luma component and a default chroma delta QP indicated by the flag;

determining, in a case that the flag is equal to the second value different from the first value, the QP for the chroma component of the region by:

(a) obtaining a delta chroma QP; and (b) determining the QP for the chroma component as a second function of the QP for the luma component and the delta chroma QP; and decoding the chroma component using the QP for the chroma component using the parameter set that is activated for decoding the region.

2. The method of claim 1, wherein the first function is an addition function.

3. The method of claim 1, wherein the second function is an addition function.

4. The method of claim 1, wherein the region corresponds to a picture or a portion smaller than the picture.

5. The method of claim 1, wherein the default chroma delta QP indicated by the flag is determined based on a mapping, and wherein the mapping is changed by a signaling in the bitstream.

6. A method of generating a bitstream, comprising:

determining a quantization parameter (QP) for a luma component of a region of a visual information in the bitstream;

including information in a data unit of a parameter set for determining a QP for a chroma component of the region by performing:

in response to the QP for the chroma component of the region being equal to a value of a first function of a default chroma delta QP and the QP for the luma component, including a flag having a first value in the data unit, wherein the first value indicates an absence of an offset in the bitstream; or in response to the QP for the chroma component of the region being not equal to the value of the first function of the default chroma delta QP for the chroma component and the QP for the luma component, including the flag having a second value and a value indicative of a delta chroma QP in the data unit, wherein the second value indicates a presence of the offset to the QP for the luma component in the bitstream; and output the bitstream including the data unit.

7. The method of claim 6, wherein the first function is an addition function.

8. The method of claim 6, wherein the QP for the chroma component being not equal to the value of the first function of the default chroma delta QP for the chroma component and the QP for the luma component is a second function of the QP for the luma component and the delta chroma QP, and wherein the second function is an addition function.

9. The method of claim 6, wherein the region corresponds to a picture or a portion smaller than the picture.

10. The method of claim 6, wherein the default chroma delta QP is determined based on a mapping, and wherein the mapping is changed by the bitstream.

* * * * *